US007216294B2

(12) United States Patent
Gibbs et al.

(10) Patent No.: US 7,216,294 B2
(45) Date of Patent: May 8, 2007

(54) METHOD AND SYSTEM FOR PREDICTING OPTIMAL HTML STRUCTURE WITHOUT LOOK-AHEAD

(75) Inventors: Matthew E. Gibbs, Redmond, WA (US); Daniel R. Lehenbauer, Redmond, WA (US); Shanku S. Niyogi, Bellevue, WA (US); Greg D. Schechter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 547 days.

(21) Appl. No.: 09/999,565

(22) Filed: Nov. 1, 2001

(65) Prior Publication Data

US 2004/0205561 A1 Oct. 14, 2004

Related U.S. Application Data

(60) Provisional application No. 60/317,160, filed on Sep. 4, 2001.

(51) Int. Cl.
*G06F 15/00* (2006.01)
*G06F 17/21* (2006.01)
*G06F 15/16* (2006.01)

(52) U.S. Cl. .............. 715/513; 715/517; 715/522; 715/523; 709/203; 709/228

(58) Field of Classification Search .............. 715/513, 715/500.1, 526; 709/217, 213; 455/466
See application file for complete search history.

(56) References Cited

U.S. PATENT DOCUMENTS

| | | | |
|---|---|---|---|
| 3,937,925 A | 2/1976 | Boothroyd | |
| 3,956,615 A | 5/1976 | Anderson et al. | |
| 4,186,871 A | 2/1980 | Anderson et al. | |
| 4,807,154 A | 2/1989 | Scully et al. | |
| 4,847,785 A | 7/1989 | Stephens | |
| 4,949,300 A | 8/1990 | Christenson et al. | |
| 4,979,148 A | 12/1990 | Bush et al. | |

(Continued)

FOREIGN PATENT DOCUMENTS

EP    1156415    11/2001

(Continued)

OTHER PUBLICATIONS

Heins et al., "Taking Your Information Into the Wireless World: Developing Information for Delivery to Mobile Devices", IEEE, pp. 237-244, Oct. 2001.*

(Continued)

*Primary Examiner*—William Bashore
*Assistant Examiner*—Maikhanh Nguyen
(74) *Attorney, Agent, or Firm*—Merchant & Gould P.C.

(57) ABSTRACT

The present invention is directed towards providing a system and method for optimizing HTML output in a just-in-time compiling environment for devices such as mobile devices. A method is provided for optimizing the output in a single pass as device content is rendered. The method delays writing a closing tag until it is determined that a formatting or layout of the next control conflicts. Tags are emitted in a predefined order to minimize the number of tags that will need to be closed to accommodate a following control whose style differs. Object hierarchy is leveraged to predict the order in which tags should be written without looking ahead of the current control in the hierarchy.

16 Claims, 12 Drawing Sheets

U.S. PATENT DOCUMENTS

| | | |
|---|---|---|
| 5,299,315 A | 3/1994 | Chin et al. |
| 5,349,657 A | 9/1994 | Lee |
| 5,388,156 A | 2/1995 | Blackledge, Jr. et al. |
| 5,465,332 A | 11/1995 | Deloye et al. |
| 5,517,655 A | 5/1996 | Collins et al. |
| 5,548,340 A | 8/1996 | Bertram |
| 5,550,560 A | 8/1996 | Kanada et al. |
| 5,604,908 A | 2/1997 | Mortson |
| 5,638,176 A | 6/1997 | Hobbs et al. |
| 5,640,449 A | 6/1997 | Worley et al. |
| 5,649,131 A * | 7/1997 | Ackerman et al. .......... 715/744 |
| 5,664,228 A | 9/1997 | Mital |
| 5,675,520 A | 10/1997 | Pitt, III et al. |
| 5,706,505 A | 1/1998 | Fraley et al. |
| 5,732,256 A | 3/1998 | Smith |
| 5,732,267 A | 3/1998 | Smith |
| 5,745,103 A | 4/1998 | Smith |
| 5,748,890 A | 5/1998 | Goldberg et al. |
| 5,774,670 A | 6/1998 | Montulli |
| 5,793,982 A | 8/1998 | Shrader et al. |
| 5,812,996 A | 9/1998 | Rubin et al. |
| 5,835,724 A | 11/1998 | Smith |
| 5,855,020 A | 12/1998 | Kirsch |
| 5,878,141 A | 3/1999 | Daly et al. |
| 5,878,282 A | 3/1999 | Mital |
| 5,897,622 A | 4/1999 | Blinn et al. |
| 5,911,068 A | 6/1999 | Zimmerman et al. |
| 5,918,007 A | 6/1999 | Blackledge, Jr. et al. |
| 5,940,075 A | 8/1999 | Mutschler, III et al. |
| 5,940,847 A | 8/1999 | Fein et al. |
| 5,953,524 A | 9/1999 | Meng et al. |
| 5,956,489 A | 9/1999 | San Andres et al. |
| 5,961,601 A | 10/1999 | Iyengar |
| 5,963,952 A | 10/1999 | Smith |
| 5,983,227 A | 11/1999 | Nazem et al. |
| 5,991,802 A | 11/1999 | Allard et al. |
| 5,995,753 A * | 11/1999 | Walker ....................... 717/108 |
| 6,006,230 A | 12/1999 | Ludwug et al. |
| 6,014,637 A | 1/2000 | Fell et al. |
| 6,014,666 A | 1/2000 | Helland et al. |
| 6,023,714 A * | 2/2000 | Hill et al. ................... 715/513 |
| 6,032,207 A | 2/2000 | Wilson |
| 6,038,551 A | 3/2000 | Barlow et al. |
| 6,067,578 A | 5/2000 | Zimmerman et al. |
| 6,072,664 A | 6/2000 | Aoyagi et al. |
| 6,076,108 A | 6/2000 | Courts et al. |
| 6,101,607 A | 8/2000 | Bachand et al. |
| 6,108,717 A | 8/2000 | Kimura et al. |
| 6,115,744 A | 9/2000 | Robins |
| 6,121,968 A | 9/2000 | Arcuri et al. |
| 6,138,150 A | 10/2000 | Nichols et al. |
| 6,138,171 A * | 10/2000 | Walker ....................... 719/318 |
| 6,167,524 A | 12/2000 | Goodnow et al. |
| 6,173,316 B1 * | 1/2001 | De Boor et al. ............ 709/218 |
| 6,178,461 B1 | 1/2001 | Chan et al. |
| 6,185,608 B1 | 2/2001 | Hon et al. |
| 6,203,220 B1 | 3/2001 | Takenoshita et al. |
| 6,205,480 B1 | 3/2001 | Broadhurst et al. |
| 6,212,192 B1 | 4/2001 | Mirashrafi et al. |
| 6,218,958 B1 | 4/2001 | Eichstaedt et al. |
| 6,230,160 B1 | 5/2001 | Chan et al. |
| 6,246,422 B1 | 6/2001 | Emberling et al. |
| 6,247,044 B1 | 6/2001 | Gosling et al. |
| 6,253,228 B1 | 6/2001 | Ferris et al. |
| 6,253,234 B1 | 6/2001 | Hunt et al. |
| 6,279,151 B1 | 8/2001 | Breslau et al. |
| 6,286,133 B1 | 9/2001 | Hopkins |
| 6,300,947 B1 * | 10/2001 | Kanevsky ................... 715/866 |
| 6,326,957 B1 | 12/2001 | Nathan et al. |
| 6,334,157 B1 | 12/2001 | Oppermann et al. |
| 6,343,148 B2 | 1/2002 | Nagy |
| 6,351,767 B1 | 2/2002 | Batchelder et al. |
| 6,353,447 B1 | 3/2002 | Truluck et al. |
| 6,354,477 B1 | 3/2002 | Trummer |
| 6,363,352 B1 | 3/2002 | Dailey et al. |
| 6,370,561 B1 | 4/2002 | Allard et al. |
| 6,373,841 B1 | 4/2002 | Goh et al. |
| 6,397,253 B1 | 5/2002 | Quinlan et al. |
| 6,401,099 B1 | 6/2002 | Koppolu et al. |
| 6,401,132 B1 * | 6/2002 | Bellwood et al. ........... 709/246 |
| 6,405,241 B2 | 6/2002 | Gosling et al. |
| 6,412,008 B1 * | 6/2002 | Fields et al. ................. 709/228 |
| 6,430,575 B1 | 8/2002 | Dourish et al. |
| 6,457,030 B1 * | 9/2002 | Adams et al. ............... 715/523 |
| 6,460,071 B1 | 10/2002 | Hoffman |
| 6,460,141 B1 | 10/2002 | Olden |
| 6,463,442 B1 | 10/2002 | Bent et al. |
| 6,470,381 B2 * | 10/2002 | De Boor et al. ............ 709/217 |
| 6,480,894 B1 | 11/2002 | Courts et al. |
| 6,487,665 B1 | 11/2002 | Andrews et al. |
| 6,505,238 B1 | 1/2003 | Tran |
| 6,509,913 B2 * | 1/2003 | Martin et al. ................ 715/762 |
| 6,535,896 B2 * | 3/2003 | Britton et al. ............... 715/523 |
| 6,546,516 B1 | 4/2003 | Wright et al. |
| 6,556,217 B1 * | 4/2003 | Makipaa et al. ............. 345/667 |
| 6,557,038 B1 | 4/2003 | Becker et al. |
| 6,560,598 B2 | 5/2003 | Delo et al. |
| 6,560,618 B1 | 5/2003 | Ims |
| 6,564,251 B2 | 5/2003 | Katariya et al. |
| 6,591,272 B1 | 7/2003 | Williams |
| 6,606,418 B2 | 8/2003 | Mitchell et al. |
| 6,610,105 B1 * | 8/2003 | Martin et al. ................ 715/513 |
| 6,622,168 B1 | 9/2003 | Datta |
| 6,633,416 B1 | 10/2003 | Benson |
| 6,704,728 B1 * | 3/2004 | Chang et al. ................... 707/5 |
| 6,714,794 B1 * | 3/2004 | O'Carroll ................... 455/466 |
| 6,725,219 B2 | 4/2004 | Nelson et al. |
| 6,728,421 B2 | 4/2004 | Kokemohr |
| 6,826,597 B1 * | 11/2004 | Lonnroth et al. ........... 709/207 |
| 6,886,013 B1 * | 4/2005 | Beranek ....................... 707/10 |
| 6,901,437 B1 * | 5/2005 | Li ................................. 709/219 |
| 6,954,751 B2 * | 10/2005 | Christfort et al. ............... 707/6 |
| 6,961,776 B1 * | 11/2005 | Buckingham et al. ...... 709/229 |
| 2001/0037404 A1 * | 11/2001 | Hafsteinsson et al. ...... 709/203 |
| 2001/0054020 A1 | 12/2001 | Barth et al. |
| 2002/0004815 A1 | 1/2002 | Muhlestein et al. |
| 2002/0008703 A1 | 1/2002 | Merrill et al. |
| 2002/0073163 A1 * | 6/2002 | Churchill et al. ............ 709/214 |
| 2002/0078101 A1 * | 6/2002 | Chang et al. ................ 707/523 |
| 2002/0078144 A1 * | 6/2002 | Lamkin et al. .............. 709/203 |
| 2002/0083171 A1 | 6/2002 | Hoogenboom et al. |
| 2002/0095445 A1 * | 7/2002 | alSafadi et al. .............. 707/517 |
| 2002/0103858 A1 * | 8/2002 | Bracewell et al. ........... 707/513 |
| 2002/0107891 A1 * | 8/2002 | Leamon et al. .............. 707/513 |
| 2002/0108102 A1 | 8/2002 | Muhlestein et al. |
| 2002/0116534 A1 * | 8/2002 | Teeple ........................ 709/246 |
| 2002/0120753 A1 * | 8/2002 | Levanon et al. ............. 709/228 |
| 2002/0161928 A1 * | 10/2002 | Ndili .......................... 709/246 |
| 2002/0188890 A1 | 12/2002 | Shupps et al. |
| 2003/0009476 A1 | 1/2003 | Fomenko et al. |
| 2003/0009519 A1 | 1/2003 | Gosling et al. |
| 2003/0009567 A1 * | 1/2003 | Farouk ........................ 709/229 |
| 2003/0018827 A1 | 1/2003 | Gutherie et al. |
| 2003/0025728 A1 | 2/2003 | Ebbo et al. |
| 2003/0028565 A1 | 2/2003 | Landsman et al. |
| 2003/0074634 A1 | 4/2003 | Emmelmann |
| 2003/0097639 A1 | 5/2003 | Niyogi et al. |
| 2003/0187952 A1 * | 10/2003 | Young et al. ................ 709/219 |
| 2004/0003112 A1 | 1/2004 | Alles et al. |
| 2004/0003139 A1 | 1/2004 | Cottrille et al. |
| 2004/0003248 A1 | 1/2004 | Arkhipov |
| 2004/0073873 A1 | 4/2004 | Croney et al. |

| | | | |
|---|---|---|---|
| 2004/0172484 | A1 * | 9/2004 | Hafsteinsson et al. ...... 709/246 |

FOREIGN PATENT DOCUMENTS

| | | |
|---|---|---|
| EP | 1156427 | 11/2001 |
| EP | 1156428 | 11/2001 |
| EP | 1164473 | 12/2001 |
| EP | 01111680.3-2201- | 4/2002 |
| EP | 01111681.1-2201- | 4/2002 |
| GB | 2339374 A * | 1/2000 |
| WO | WO 98/21651 | 5/1998 |
| WO | WO 98/44695 | 10/1998 |
| WO | WO 99/34288 | 7/1999 |
| WO | WO 0127783 A * | 4/2001 |
| WO | WO 01755667 A * | 10/2001 |
| WO | WO 02213434 A * | 3/2002 |

OTHER PUBLICATIONS

Kirda, "Web Engineering Device Independent Web Services", Distributed Systems Group, IEEE, pp. 795-796, May 2001.*

Kagal et al., "Centaurus: A Framework for Intelligent Services in a Mobile Environment", Computer Science and Electrical Engineering, IEEE, pp. 295-201, Apr. 2001.*

Kitayama et al., "Design of a Framework for Dynamic Content Adaptation to Web-Enabled Terminals and Enterprise Applications", IBM Research, IEEE, pp. 72-79, Dec. 1999.*

Ciancarini et al., "An extensible rendering engine for XML and HTML", Computer Networks and ISDN System, North Holland Publishing, Nol. 30, No. 1-7, Apr. 1998, pp. 225-237.*

Alves Dos Santos, L.M., "Multimedia Data and Tools for Web services over Wireless Platforms", IEEE Personal Communications, Oct. 1998, pp. 42-46.*

Krikelis, A., "Mobile multimedia: shaping the Infoverse", IEEE Concurrency, Jan.-Mar. 1999, pp. 7-9.*

"A Brief History of Hypertext", from Microsoft Corporation © 1996.

"Alterego Networks Introduces First Mobile Web Server for Enterprises, Telcos and Providers"; Redwood City, CA; Nov. 14, 2000; 3 pages.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

"Bluestone Software Layes Foundation for Internet Operating Environment with Total-E-Server . . . " Screaming Media, Business Wire; Jun. 5, 2000; 3 pages.

"Developing ASP-Based Applications" from Microsoft Corporation © 1996.

"HTML Encyclopaedia"; http://www.scit.wlv.ac.uk/encyc/form.html; 2 pages.

"HTTP Made Really Easy—A Practice Guide to Writing Clients and Servers", by Marshall, Aug. 15, 1997.

Anderson, Richard; Homer, Alex; Howard, Rob; Sussman, Dave; "A Preview of Activer Server Pages+"; Copyright 2000, Wrox Press, pp. 1-73.

Article, ColdFusion Web Application Server, update and summary, from Allaire Corp—www@allaire.com.

Chapter 3, "Mechanics of Developing JavaScript Applications," Server-Side Javascript Guide, 'Online! 1999, pp. 51-108, www.Developer.netscape.com/docs/manuals, ssjs/1_4/ssjs.pdf>.

Chapter 6, "Session Management Service," Server-Side Javascript Guide, 'Online! 1999, pp. 125-166, www.developer.netscape.com/docs/manuals/ssjs/1_4/ssjs.pdf>.

Custer, Helen; "Inside Windows NT"; Microsoft Press 1993; pp. 74-81.

Davulcu, Hasan; Freire, Juliana; Kifer, Michael; Ramakrishnan, I.V.; "A Layered Architecture for Querying Dynamic Web Content"; ACM 1999; pp. 491-502.

Dobson, R., "Data Binding in Dynamic HTML," DBMS MAG, 'Online! Mar. 1998 pp. 47-52.

Dowd, Tyson et al., "Compiling Mercury to the .NET Common Language Runtime," Electronic Notes in Theoretical Computer Sciences 59 No. 1 (Netherlands) (2001), pp. 1-16.

Duan, Nick N.; "Distributed Database Access in a Corporate Environment Using Java" Bell Atlantic Corporation; 1996; 8 pages.

Esposito, Dino, "Heaven sent," Developer Network Journal, Mar.-Apr. 2001, Matt Publishing, UK, No. 23, pp. 18-24.

Franklin, K., "Supercharge Data Binding," Visual Basic Programmer's Journal, Mar. 2000, Fawcette Technical Publications, vol. 10, No. 3, pp. 32-33, 39-40, 42, 44, 46.

Frost, Jim: "Windows NT Security"; May 4, 1995; 7 pages; http://world.std.com/~jimf/papers/nt-security/nt-security.html.

Hammock swings through Web Interfaces (3 pages) by Eric Hammond.

Hammock(TM), Think of it as Swing(TM) for the Web (10 pages).

Hannay, Phillip et al., "MSIL For the .NET Framework: The Next Battleground?", Virus Bulletin Conference, Sep. 2001, pp. 173-196.

Holmes, John W.; e-Mail response to question regarding GET/POST.HTTP request, extracted from GOOGLE's News Groups, php.general, Nov. 11, 2002.

Hovanes, Michael E.; Deal, John R. Grizz; Rowberg, Alan H.; "Seamless Multiresolution Display of Portable Wavelet-Compressed Images" Journal of Digital Imaging, vol. 12, No. 2 suppl 1 (May), 1999, pp. 109-111.

Ingham, David B.; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.

Kunz, T.; El Shentenawy, M.; Gaddah, A..; Hafez, R.; Image Transcoding for Wireless WWW Access: The User Perspective; Multimedia Computing and Networking 2002, Proceedings of SPIE vol. 467 (2002) pp. 28-33.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, Vo. 21, No. 3, Oct. 2001, pp. 131-137.

Li, W.-S., "PowerBookmarks: a system for personalizable Web information organization, sharing, and management," Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. And Systems, Dec. 11, 1999, pp. 179-184.

Nadamoto, Akiyo; Kondo, Hiroyuki; Tanaka, Katsumi; "WebCarousel: Restructuring Web Search Results for Passive Viewing in Mobile Environments" IEEE 2001 p. 164-165.

"NCSA httpd" nttpd@ncsa.uiuc.edu.

O'Leary, M., "Web personalization Does It Your Way," O'Leary Online, vol. 23, No. 2, Mar.-Apr. 1999, pp. 79-80.

OOP Launches Hammock at JavaOne (1 page).

Penn, Gerald; Hu Jianying; Luo, Hengbin; McDonald, Ryan; "Flexible Web Document Analysis for Deliver to Narrow-Bandwidth Devices"; IEEE 2001; pp. 1074-1078.

Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generation XP Style webparts from a web control," The Code Project—Generating XP style webparts from a web control—ASP.NET, online at http://www.codeproject.com/aspnet/webpartscontrol.asp, retrieved Apr. 8, 2004, 10 pages.

Sells, Chris et al., "Generating Code at Run Time with Reflection. Emit," Windows Developer Magazine, Aug. 2002, vol. 13, No. 8, pp. 26-34.

Shapiro, M., "A Binding Protocol for Distributed Shared Objects," Proceedings of the International Conference on Distributed Computing Systems, Poznan, Poland, Jun. 21-24, 1994, Los Alamitos, IEEE COMP. SOC. PRESS.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Solomon, David A. "Inside Windows NT, Second Edition"; Microsoft Press 1998; pp. 310-319.

Stewart, Tony: "The Document as Application: Issues and Implications" GCA XML Europe 1999; pp. 575-599.

Syme, Don, "ILX: Extending the .NET Common IL for Functional Language Interoperability," Electronic Notes in Theoretical Computer Science 59 No. 1 (2001), pp. 1-20.

Varela, Carlos A.; Caroline C. Hayes; "Providing Data on the Web: From Examples to Programs," Second International WWW Conference, Chicago, IL; Oct. 17, 1994; 17 pages.

Wu, Dapeng; Hou, Yiwci Thomas-Zhang, Ya-Qin; "Scalable Video Transport over Wireless IP Networks"; IEEE 2000; pp. 1185-1191.

* cited by examiner

| ROW | WRITER.METHODS: | TRADITIONAL OUTPUT: | IMPROVED OUTPUT: |
|---|---|---|---|
| 1. | EnterStyle(Label1.Style) | <b><i><font color="Blue"> | |
| 2. | Write(Label1.Text) | Hello | <font color="Blue"><b><i>Hello |
| 3. | ExitStyle(Label1.Style) | </font></i></b> | |
| 4. | EnterStyle(Label2.Style) | <b><font color="Red"> | |
| 5. | Write(Label2.Text) | World | </i><font color="Red">World |
| 6. | ExitStyle(Label2.Style) | </font></b> | |
| 7. | EnterStyle(Label3.Style) | <b><font color="Blue"> | |
| 8. | Write(Label3.Text) | !!! | </font>!!! |
| 9. | ExitStyle(Label3.Style) | </font></b><br> | |
| 10. | (Results of draining TAG STACK) | | </font></b> |

*Fig. 6.*

METHOD AND SYSTEM FOR PREDICTING OPTIMAL HTML STRUCTURE WITHOUT LOOK-AHEAD

RELATED APPLICATIONS

This utility patent application is a continuation of a previously filed U.S. Provisional Application No. 60/317,160 filed on Sep. 4, 2001, the benefit of the filing date, which is hereby claimed under 35 U.S.C. §119(e).

FIELD OF THE INVENTION

The present invention relates generally to computer-executable software, and more particularly to improving throughput on mobile devices.

BACKGROUND OF THE INVENTION

In recent years, there has been an increased use of mobile client devices that provide active content to the user. A mobile web page, such as an ASP.Net page, may be constructed of a hierarchy of server-side controls. When a page is executed, the objects in the page hierarchy are traversed to render markup (such as HTML, compact HTML (cHTML), wireless markup language (WML), and the like) that is transmitted to the client device. During the rendering process, formatting and layout information specified for the controls is transformed into markup tags interpreted by the client device to produce the desired appearance on the display. In the most straightforward implementation, these markup tags are generated for each object in the hierarchy, potentially resulting in a great deal of redundant content being transmitted to the client device. Traditional methods for optimization have relied on the markup being known in its entirety. These traditional methods require a two pass process: the first pass gathering the markup, and the second analyzing the rendered markup to optimize where possible. Such traditional methods typically result in slower page updates to the client device, and potentially higher server computational costs.

Moreover, typical mobile connection speeds are a fraction of the current dialup connection speeds available on a desktop PC. The latency between a request and a response on many mobile connections has been a concern in the industry, and a frustration to the mobile user.

Additionally, typical mobile devices, especially cell phones, often have severe memory limitations, putting a restriction on how much data can be transmitted to the device.

Yet another concern arises in locations or countries where the end-user fee structure of browser-enabled mobile devices is a function of the amount of data transmitted.

Thus, there is a need in the art for a method and system directed at improving throughput on mobile devices.

SUMMARY OF THE INVENTION

The present invention is directed towards providing a system and method for optimizing HTML output in a just-in-time compiling environment for devices such as mobile devices.

In accordance with one aspect of the present invention, a system is directed towards the rendering of content on a device in response to a request from the device. The system includes server objects, a state-machine, and a writer. The server objects contain information that is related to the display of the content on the device. The state-machine is coupled to the server objects and is configured to preserve a current style state and a desired style state. The writer is coupled to the state-machine and is configured to dynamically determine whether the current style state matches the desired style state. If it is determined that the current style state does not match the desired style state, then the writer outputs a sufficient number of markup tags to transition from the current style state to the desired style state, wherein at least one unnecessary markup tag is not written to the device.

In another aspect of the above system, the system includes a device capabilities component that is coupled to the writer. The device capabilities component provides to the writer capabilities of the device by extracting an identification from the request of the device. Further, in yet another aspect of the above system, the writer dynamically determines the sufficient number of markup tags to be written such that markup tags not supported by the capabilities of the device are identified as unnecessary.

In yet another aspect of the present invention, a computer-implemented method is directed at providing markup output to a requesting device. The computer-implemented method includes receiving a request for the markup output, receiving a desired style state that represents a desired style state of markup tags, comparing the desired style state to a current style state that represents a current style state of markup tags, and if the desired style state is different from the current style state, outputting a sufficient number of markup tags to transition from the current style state to the desired style state, wherein at least one unnecessary markup tag is not written to the device.

In still another aspect of the present invention, the computer-implemented method above delays actually writing out a closing markup tag until the desired style state conflicts with the current style state. Further, in another aspect of the above computer-implemented method, the outputting a sufficient number of markup tags includes nesting the markup tags in a predetermined order that causes unnecessary close markup tags to be omitted.

A more complete appreciation of the present invention and its improvements can be obtained by reference to the accompanying drawings, which are briefly summarized below, to the following detailed description of illustrative embodiments of the present invention, and to the appended claims.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein:

FIG. 6 illustrates a traditional approach to markup output that would be generated by the example illustrated in FIG. 5 and the markup output generated by the present invention;

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments through which the present invention may be practiced. The present invention may, however, be embodied in many different forms and should not be construed as limited to the embodiments set forth herein; rather, these embodiments are provided so that this disclosure will be thorough and complete, and will fully convey the scope of the present invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled" means a direct connection between the things that are connected, or an indirect connection either through one or more passive or active intermediary devices or components. The meaning of "a," "an," and "the" include plural references. The meaning of "in" includes "in" and "on."

Briefly stated, the present invention is directed towards providing a system and method for optimizing HTML output in a just-in-time compiling environment for such devices as mobile devices. Among other things, disclosed is a system, which employs a state machine to optimize the markup tag outputs in a single pass as device content is rendered. First, an illustrative operating environment and computing server are described. Then, components employed for optimizing the device content are discussed. Finally, methods for determining when tags are emitted to a device such that the number of tags is minimized (i.e., optimized) are disclosed.

Illustrative Operating Environment

Figure 1:
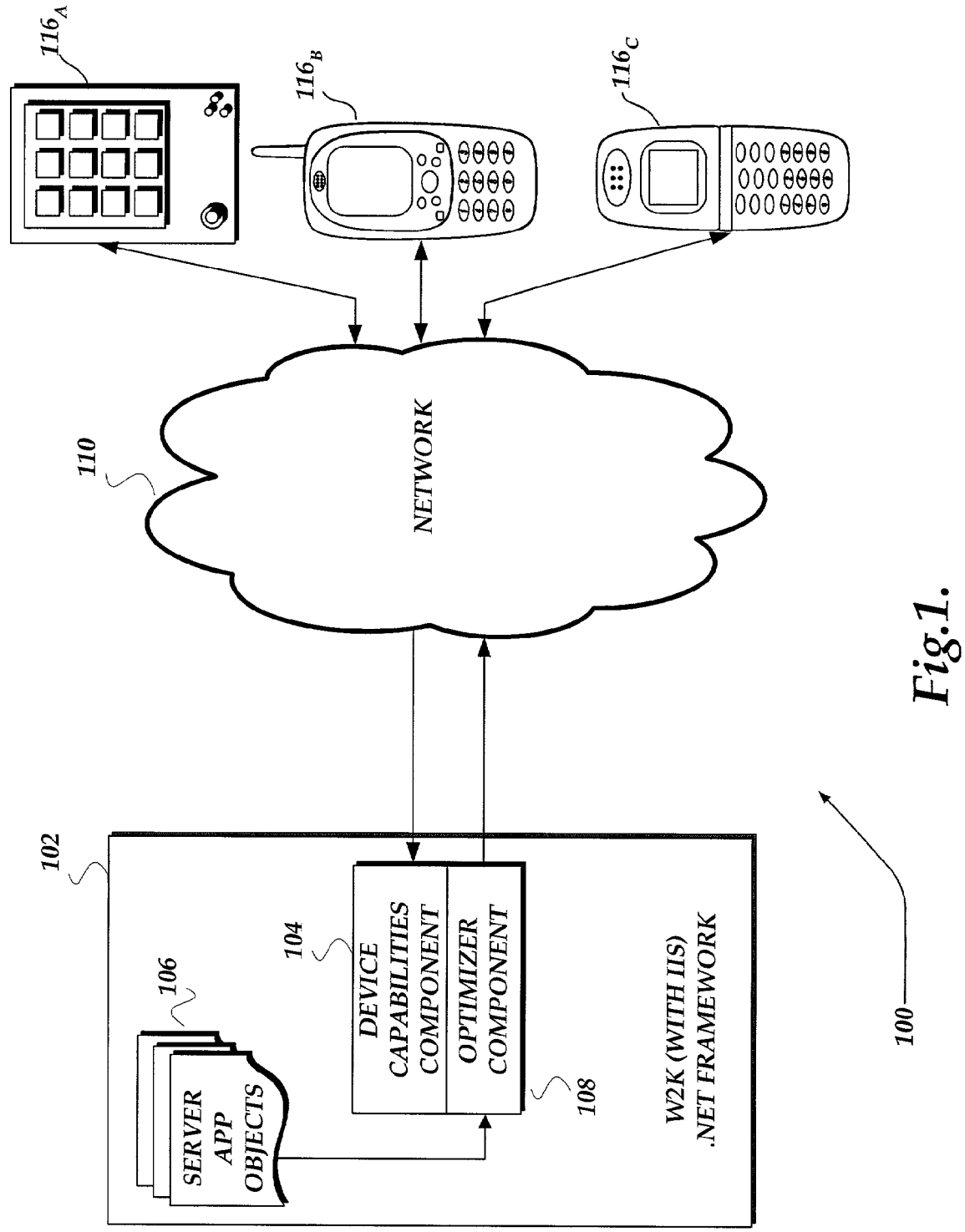
FIG. 1 shows a functional block diagram illustrating an exemplary environment for practicing the invention.

FIG. 1 shows a functional block diagram illustrating an exemplary environment for practicing the present invention, according to one embodiment of the invention. The environment includes server 102, network 110, and mobile devices $116_{A-C}$. Server 102 includes server application objects 106, device capabilities component 104, and optimizer component 108 which are described in more detail in conjunction with FIG. 3.

Mobile devices $116_{A-C}$ include such things as cell phones, pagers, web-enabled mobile devices, hand-held electronic devices, programmable and non-programmable consumer electronics, personal computers, and the like. Such devices typically range widely in terms of capabilities and features. For example, a cell phone may have a numeric keypad and a few lines of monochrome LCD display on which only text may be displayed. A web-enabled mobile device may have a touch sensitive screen, a stylus, and several lines of color LCD display in which both text and graphics may be displayed. A computer may have a keyboard, mouse, speakers, microphone, and a relatively large area on which to display forms.

It will be apparent to one of ordinary skill in the art that the present invention is not limited to mobile devices $116_{A-C}$. For example, the present invention may be employed for optimizing content to other computer devices such as desktop PCs, without departing from the spirit or scope of the present invention.

Network 110 connects server 102 and its components with mobile devices $116_{A-C}$. The network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices can be remotely connected to either LANs or WANs via a modem and temporary telephone link. In essence, network 110 includes any communication method by which information may travel from any of mobile devices $116_{A-C}$ to device capabilities component 104 and from optimizer component 108.

Figure 2:
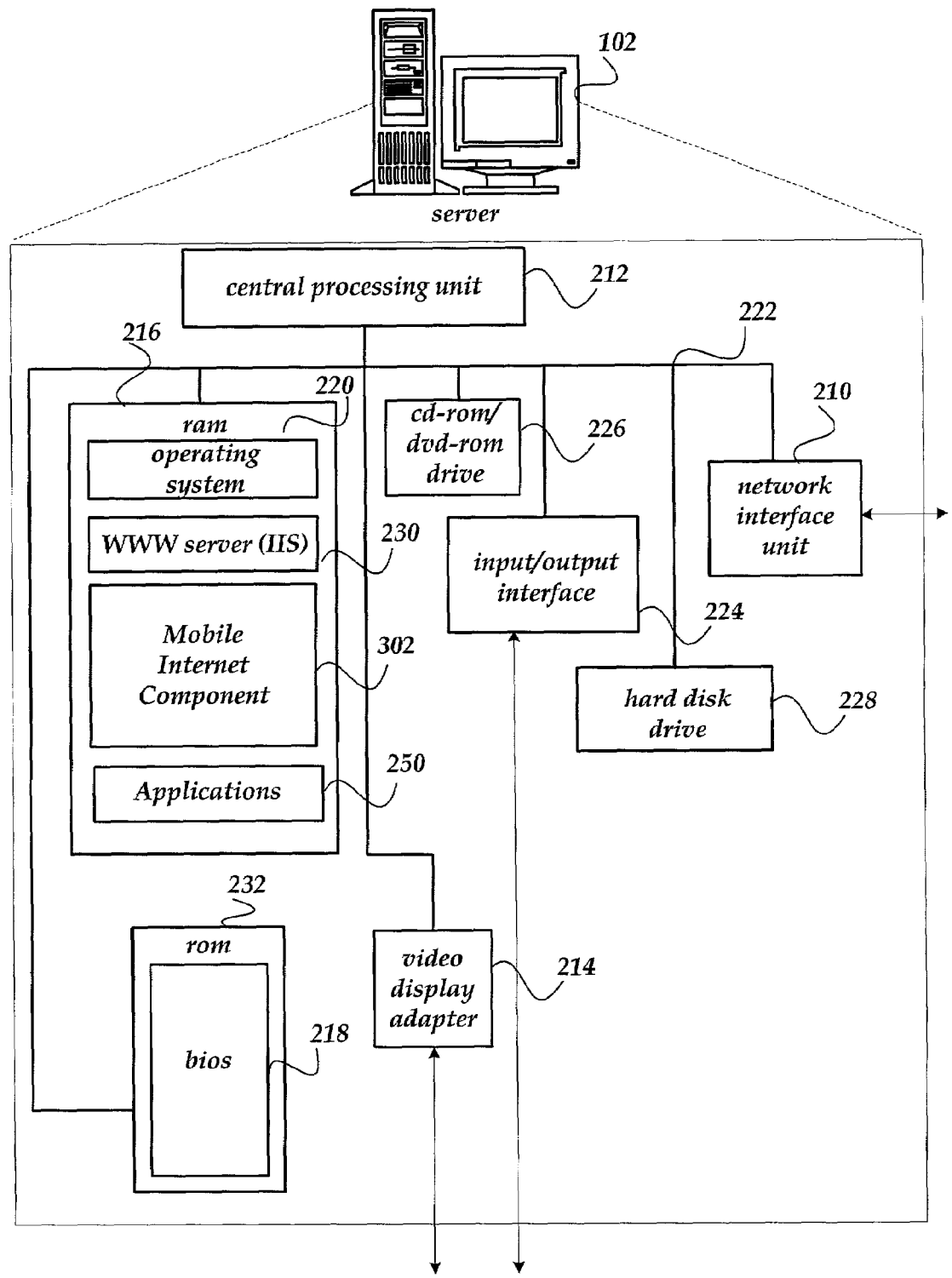
FIG. 2 shows an exemplary server that may be included in a system implementing the invention.

Server 102 is an example of a computing device, and is described in more detail in conjunction with FIG. 2. While server 102 includes device capabilities component 104, optimizer component 108, and server application objects 106, server 102 may also include other application programs and components and may be used for a variety of purposes related or unrelated to the present invention. Server 102 stores, retrieves, and executes applications and/or objects in response to requests for information from mobile devices $116_{A-C}$ through network 110. Server 102 executes device capabilities component 104 and optimizer component 108 in support of requests from mobile devices $116_{A-C}$.

Server application objects 106 include pages, forms, and other server objects (hereinafter sometimes collectively referred to as server objects) for displaying information to and receiving input from users. A server application program (not shown) may include many such server objects. Typically, the server application program is arranged in terms of pages, e.g., information that should be displayed to a user together. A page may include links to other pages, forms, controls, and other server objects. A form may be used, for example, for collecting address information. The form may display address fields, prompt a user for address and name information, validate inputted information, and send the information to the server application program for further storage and use.

A form may have controls on it to facilitate user input. For example, a form may have a radio button control for receiving a user's selection. A form may have a textbox control for receiving textual input from the user. A form may have control buttons such as OK or CANCEL to receive confirmation or cancellation from a user. A control, however, is not limited to being placed within a form; it may also be placed within a page, another control, or another server object.

Figure 3:
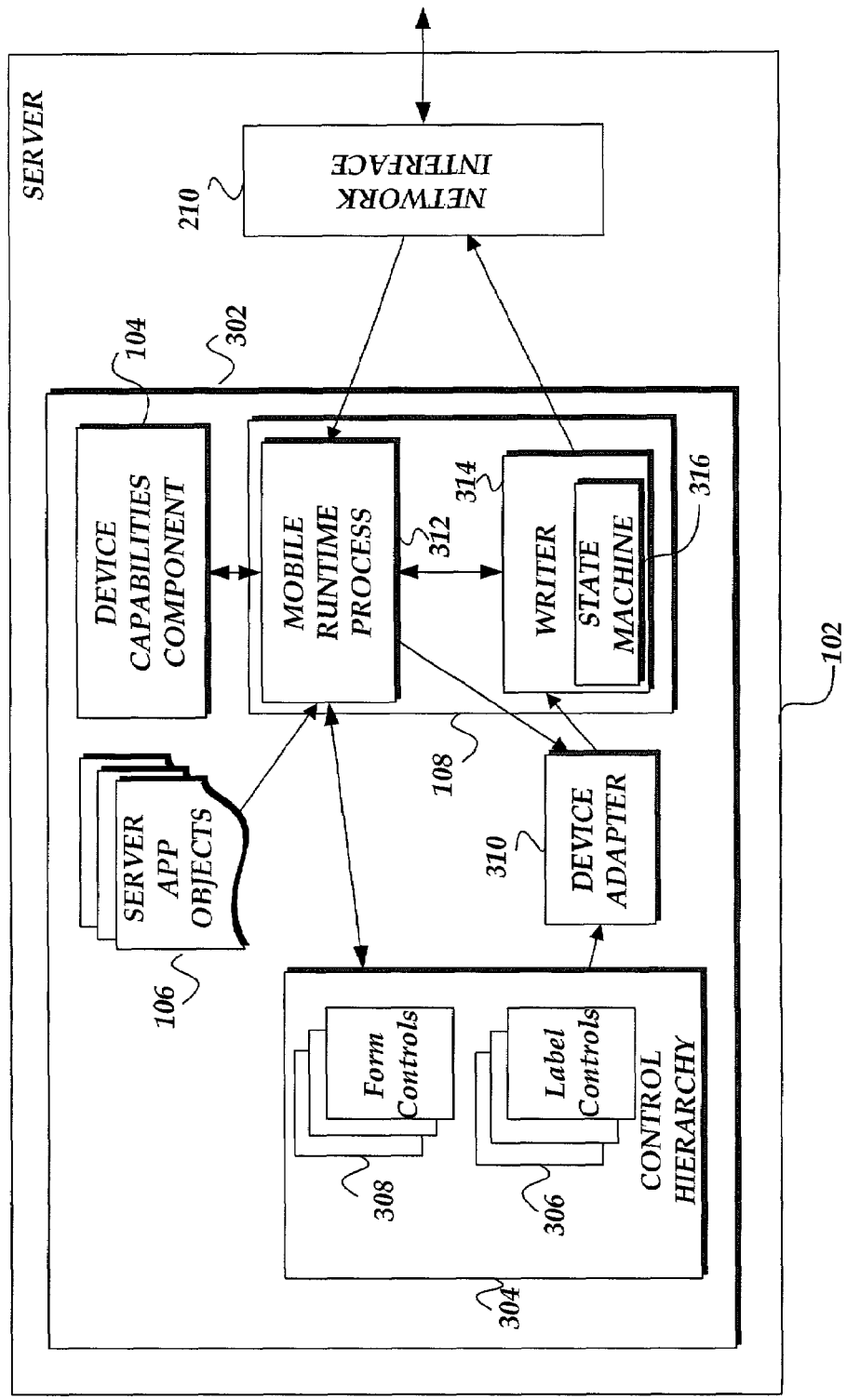
FIG. 3 shows a functional block diagram of server components employing a state machine for optimizing information.

Device capabilities component 104 is described in more detail in conjunction with FIG. 3. Briefly, however, when a communication from mobile devices $116_{A-C}$ is a request for access to a server object, device capabilities component 104 extracts identification information about the requesting mobile device from the communication to determine what capabilities a device has. Device capabilities component 104 provides such information to optimizer component 108.

Optimizer component 108, described in more detail in conjunction with FIG. 3, utilizes server application objects 106 created by a software development environment (not shown) to provide optimized content, according to one embodiment of the present invention. Optimizer component 108 may select appropriate adapters based on the capabilities of a requesting device to transform pages, forms, controls, and the like into optimized content suitable for viewing on mobile devices $116_{A-C}$.

Illustrative Server Environment

FIG. 2 shows an exemplary server 102 that may be included in a system implementing the invention, according to one embodiment of the invention. In a very basic configuration, server 102 may include many more components than those shown. Server 102 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. A general-purpose server operating system may be employed. Basic input/output system ("BIOS") 218 is also provided for controlling the low-level operation of server 102. As illustrated in FIG. 2, server 102 also can communicate with the Internet, or some other communications network, via network interface unit 366, which is constructed for use with various communication protocols including the TCP/IP protocol.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a web site on a network. More specifically, the mass memory stores application programs including WWW server 230, such as Microsoft Corporation's Internet Information Server (IIS), and mobile Internet component 302 (which includes device capabilities component 104 and optimizer component 108). These application programs include computer executable instructions which, when executed by server 102, generate displays and perform the logic described elsewhere in this specification. Server 102 also has other application programs 250 that perform logical operations. Server 102 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion.

Server 102 also includes input/output interface 224 for communicating with external devices, such as a mouse, keyboard, scanner, or other input devices not shown in FIG. 2. Likewise, server 102 may further include additional mass storage facilities such as CD-ROM/DVD-ROM drive 226 and hard disk drive 228. Hard disk drive 228 is utilized by server 102 to store, among other things, application programs, databases, server application objects 106, and program data used by WWW server 230 and mobile Internet component 302.

Operationally, when a device, such as mobile devices $116_{A-C}$, shown in FIG. 1, requests display content from server 102, the request is routed to WWW server 230. When the request is for server pages, WWW server 230 forwards the request to mobile Internet component 302. Mobile Internet component 302 employs server application objects 106, device capabilities component 104, and optimizer component 108 shown in FIG. 1 to provide optimized content to the requesting mobile devices $116_{A-C}$.

FIG. 3 is a functional block diagram of server 102, illustrating in greater detail certain server components employing a state machine for optimizing information, according to one embodiment of the invention. Server 102 includes mobile Internet component 302 and network interface 210. According to the present invention, mobile Internet component 302 includes server application objects 106, device capabilities component 104, control hierarchy 304, device adapter 310, and optimizer component 108. Mobile Internet component 302 may include many more components than those shown. Likewise, the functionality of one or more of those components may be combined into fewer components. Optimizer component 108 includes mobile runtime process 312 and writer 314. Writer 314 includes state machine 316.

Server application objects 106 are stored server objects created for a software application. Typically, server objects are not constructed for use on only one device; rather, a developer typically creates the server objects by programming to a specified programming interface. Device capabilities component 104 abstracts device capabilities such that the developer does not need to know (but can still access if desired) the exact capabilities of the device in order to create an object to display on the device. Instead, the developer may create an object, which calls a feature-rich programming interface and relies on device adapter 310 to transform such calls in device-specific ways during requests from mobile devices $116_{A-C}$.

Mobile runtime process 312 builds the markup for the requesting device from control hierarchy 304, which mobile runtime process 312 constructed from server application objects 106. Controls encapsulate data that dictates how a control should be rendered for use by mobile devices $116_{A-C}$. One embodiment of a control is Label controls 306 which are employed to display text on mobile devices $116_{A-C}$. For example, a text property of Label control 306 specifies the text that is to be rendered. Another embodiment of a control is Form controls 308. Form controls 308 maybe considered as container controls with no visible representation, and are typically employed to call render methods of each of the controls contained in the form. Yet, another embodiment of a control that may be included in control hierarchy 304 is Style Controls (not shown), which expose a collection of properties describing a desired appearance on the user display (e.g., such as bold, right aligned, and the like). A typical structure of control hierarchy 304 may include controls (not shown) that function as a primary container and includes one or more form controls. Form controls may include one or more controls, such as panel controls (not shown), which in turn may be employed to group other server controls, thus, providing a hierarchical structure.

It will be apparent to one of ordinary skill in the art that the present invention is not limited to the above-described objects. For example, other user interface controls, validation controls, or utility server objects may be included within server application objects 106 and control hierarchy 304, without departing from the spirit or scope of the present invention.

Device adapter 310 receives device capabilities and a server object, e.g. a form, page, or control, from mobile runtime process 312 and selects an adapter for transforming the server object. Typically, device adapters are arranged in adapter sets within a device adapter store (not shown). That is, the adapters associated with a particular device or set of devices is grouped (at least logically) in an adapter set. For example, a set of devices may communicate using a wireless markup language (WML). A set of adapters may be logically grouped to handle conversion to and from WML. An adapter may inherit attributes and methods from another adapter in the same or another adapter set. An adapter set may inherit adapter associations, i.e., which server objects should be mapped to which adapters, from another adapter set. Methods and attributes of ancestor adapters may be extended, restricted, or over-written. Generally, object-oriented rules apply to the relationships and interactions between related adapters. This model makes it easier to create an adapter set for a new but similar device. For example, one device may accept hypertext markup language (HTML) documents. A new device may accept compact hypertext markup language (CHTML) documents.

Device adapter 310 may be instantiated by mobile runtime process 312 or by an executing server object spawned by mobile runtime process 312. As the server object executes, it may request that a page be rendered or that information be requested from a user using a device. Upon request (through invocation of one of device adapter 310's methods), device adapter 310 begins rendering a "page" of information to deliver to the device together with any controls necessary to process the server object's request.

In one embodiment of the present invention, once a server object from server application objects 106 begins execution and device adapter 310 is instantiated, device adapter 310 may cease communicating with mobile runtime process 312. Instead, it may receive commands from and deliver information to the associated executing server object. In other words, mobile runtime process 312 may instantiate device adapter 310, execute an appropriate server object from server application objects 106, associate the instantiated device adapter 310 with the executing server objects loaded into control hierarchy 304, and "step out of the way" as the executing server object and adapter interact with each other to send information through writer 314 to a device. Mobile runtime process 312 may then be available to service a request from another device by executing another instance of the same or a different server object, instantiating another device adapter, and associating the server object with the new device adapter.

In another embodiment of the invention, mobile runtime process 312 may be more involved. It may perform tasks such as instantiating device adapter 310, constructing control hierarchy 304, executing an appropriate server object from server application objects 106, associating the instantiated device adapter with the executing server object, instantiating and associating one or more form controls 308 as needed, relaying requests and/or information between the instantiated adapter(s) and associated executing server object(s), and relaying messages to adapters(s) and/or server objects as appropriate.

Device capabilities component 104 determines what capabilities a device has based upon information transmitted by mobile devices $116_{A-C}$. Different devices may have different capabilities as discussed in conjunction with FIG. 1. Device capabilities component 104 may include a database of "known" devices or it may query a device on the fly for capabilities. Device capabilities component 104 may determine that the device capabilities are unknown. In such a case, device capabilities component 104 may send a default set of capabilities, an error, or some other message so indicating.

Optimizer component 108 includes mobile runtime process 312 and writer 314. In one embodiment, writer 314 includes state machine 316, both of which are described in more detail in conjunction with FIG. 4. However, briefly, writer 314 has high-level methods that are exposed for transmitting optimized markup information to network interface 210 to be communicated to one or more devices. State machine 316, is employed by writer 314 to preserve status information, mentioned above, during the optimization of markup output. Each adapter performing a transformation employs a single instance of writer 314 to optimize the information into a response to be sent to mobile devices $116_{A-C}$. Although device adapter 310 is shown directly connecting to writer 314, writer 314 may receive information from any adapters including form/control adapters, and/or any other adapters. In one embodiment of the invention, writer 314 may be implemented as an object having certain methods, helper functions, and attributes.

State machine 316 preserves status information about what information has been written or may be written (emitted) by writer 314.

Mobile runtime process 312 receives requests, responses, and/or information from network interface 210 (through WWW server 230 shown in FIG. 2). When a communication is a request for access to a server object, mobile runtime process 312 may request device capabilities from device capabilities component 104 and employ these capabilities together with the communication to select the appropriate adapter set from device adapter 310. Mobile runtime process 312 may receive a request from network interface 210 indicating that a device is requesting access to one or more server objects contained in server application objects 106. Mobile runtime process 312 determines which server object(s) from server application objects 106 should be executed to service the request and constructs control hierarchy 304.

Additionally, mobile runtime process 312 employs device adapter 310 to instantiate the selected adapter(s) associated with the server objects(s).

Network interface 210 transmits and receives messages over network 110. Such messages may be transmitted and received using protocols including hypertext transfer protocol (HTTP), transmission control protocol/Internet protocol (TCP/IP), ftp, SMTP, direct file transfer, combinations thereof, and the like. In essence, any transmission protocol capable for transmitting information over network 110 may be used in conjunction with network interface 210 to send information to and receive information from devices.

Some embodiments of mobile Internet component 302 and its components have been described above. In light of this disclosure, it will be understood that components and interactions of the components within mobile Internet component 302 could be changed, added, or removed without departing from the spirit and scope of this invention. The following is a description of writer 314 and state machine 316 that might be employed to dynamically remove redundant markup tags, without changing the actual appearance to the user, and thereby render optimized content for the user.

Illustrative Writer Components

Figure 4:
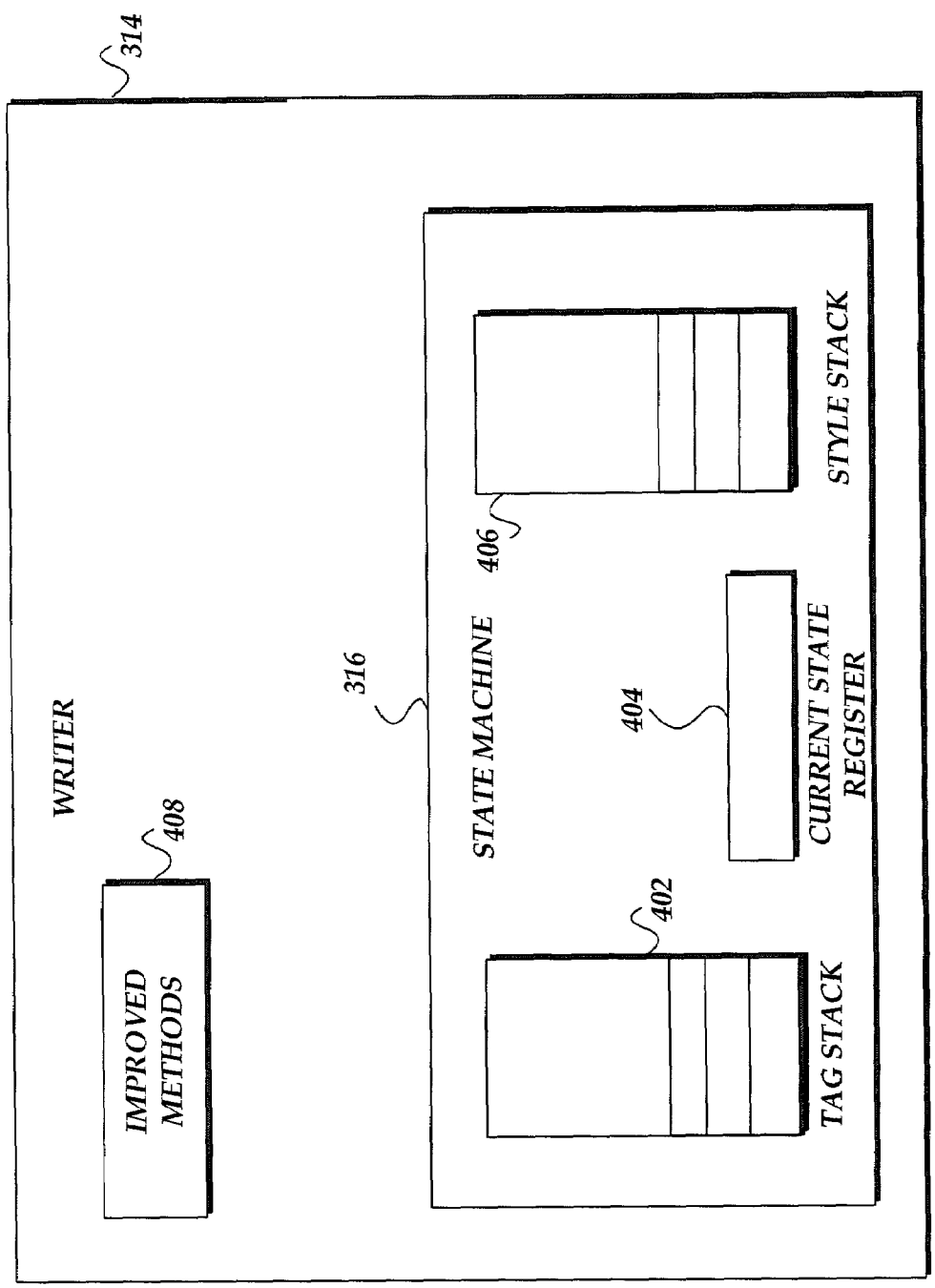
FIG. 4 shows a functional block diagram of one embodiment of a writer employing a state machine for optimizing output to a mobile device.

FIG. 4 shows a functional block diagram of writer 314 employing state machine 316 for optimizing output to a mobile device, according to one embodiment of the invention. Writer 314 also includes improved methods 408. Briefly stated, at runtime, when a control seeks to render its output, an adapter is called. Each adapter in turn, employs a single instance of writer 314. Writer 314 then evaluates what content a control 'asks' to have rendered, and determines what content will actually be written out, by employing state machine 316 and improved methods 408. Improved methods 408 will be described in more detail in conjunction with FIGS. 6–9. Briefly, however, improved methods 408 include a set of methods or programs that, among other actions, invoke state machine 316 to preserve the desired style state from the markup tags a control has requested to be written, the markup tags that have been written that are currently open, and a current style state from the active or opened markup tags.

As shown in the figure, state machine 316 includes Tag Stack 402, Current State Register 404, and Style Stack 406.

Style Stack 406 may be implemented as a data structure, buffer area, or similar means for providing a pushdown list for storing those tags representing the desired style state that a control has requested to be emitted. In one embodiment, Style Stack 406 is configured as a last-in-first-out data structure. That is, those markup tags highest on Style Stack 406 reflect the most current request. Once writer 314 emits the markup tags associated with a control, writer 314 pops them from Style Stack 406 by invoking state machine 316.

Current State Register 404 may be implemented as a data type, storage buffer, or similar means for providing storage of markup tags that are currently active or opened and represent the current style state.

Tag Stack 402 may be implemented as a data structure, buffer area, or similar means for providing a pushdown list for storing information about what markup tags have been written that remain open when writer emits the markup tags. In one embodiment, Tag Stack 402 is configured as a last-in-first-out data structure. Markup tags highest on Tag Stack 402 reflect those open or active tags most recently emitted. As writer 314 emits tags that close or deactivate previously opened or activated tags, the associated open/activated tags are popped from Tag Stack 402 by invoking state machine 316.

By way of example, if a control 'asks' to render a markup tag for generating bold text (i.e., <b>, the open bold tag), the open bold tag, <b>, will be pushed onto Style Stack 406. Once writer 314 emits the open bold tag, the tag is pushed onto Tag Stack 402. Moreover, as bold reflects the current configuration of active tags, Current State Register 404 is also updated.

Generalized Operation

The operation of the present invention will now be described with respect to FIGS. 7–9 which are flowcharts illustrating one embodiment of the present invention. After discussion of the flowcharts, FIGS. 5, 6, and 10–18 are employed to provide an illustrative example to further aid in illustrating the flowcharts.

It will be understood that each block of the flowchart illustrations (FIGS. 7–9), and combinations of blocks in the flowchart illustrations, can be implemented by computer program instructions. These program instructions may be provided to a processor to produce a machine, such that the instructions, which execute on the processor, create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 7:
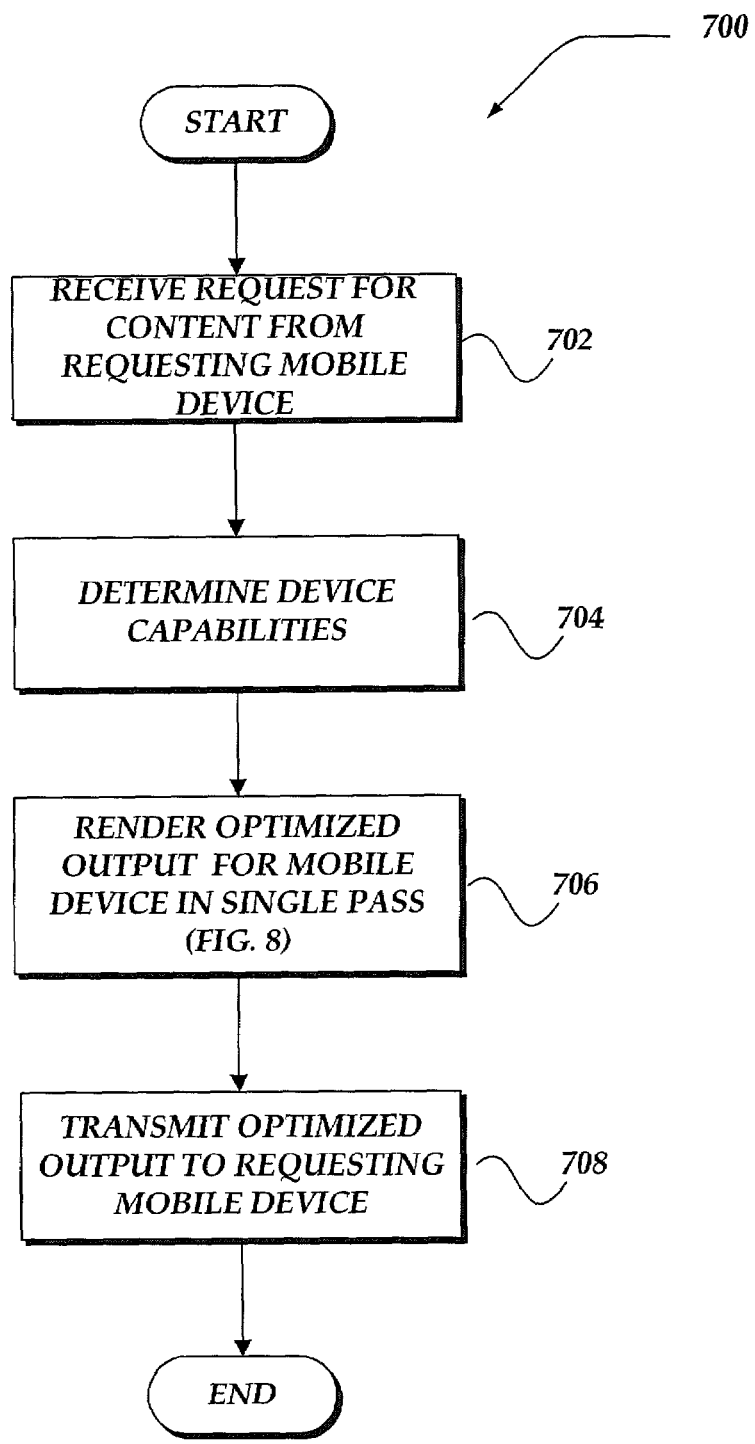
FIG. 7 illustrates a logical flow diagram generally showing one embodiment for responding to a request for server objects from a mobile device.

FIG. 7 illustrates a logical flow diagram generally showing one embodiment for responding to a request from a mobile device, in accordance with the present invention. The single-pass markup optimization process 700 begins, after a start block, at block 702 where a request to access a server object is received from a requesting device, such as mobile device $116_A$ (FIG. 1). The requesting mobile device makes a request to access server objects, such as a form object, located in server application objects 106 discussed above in conjunction with FIG. 3. Along with the request to access a server object, the requesting mobile device also provides information about itself.

The process continues at block 704 where the information about the requesting mobile device is employed to determine the device capabilities. For example, referring to FIG. 3, mobile runtime process 312 requests device capabilities from device capabilities component 104. Mobile runtime process 312 then employs the request from mobile device $116_A$ together with the device's capabilities to traverse control hierarchy 304. Moreover, information about the capabilities is used, such as, for example, to determine whether the requesting mobile device communicates using WML, cHTML, and whether the requesting mobile device may have a restricted set of display capabilities. The process continues to block 706.

Figure 8:
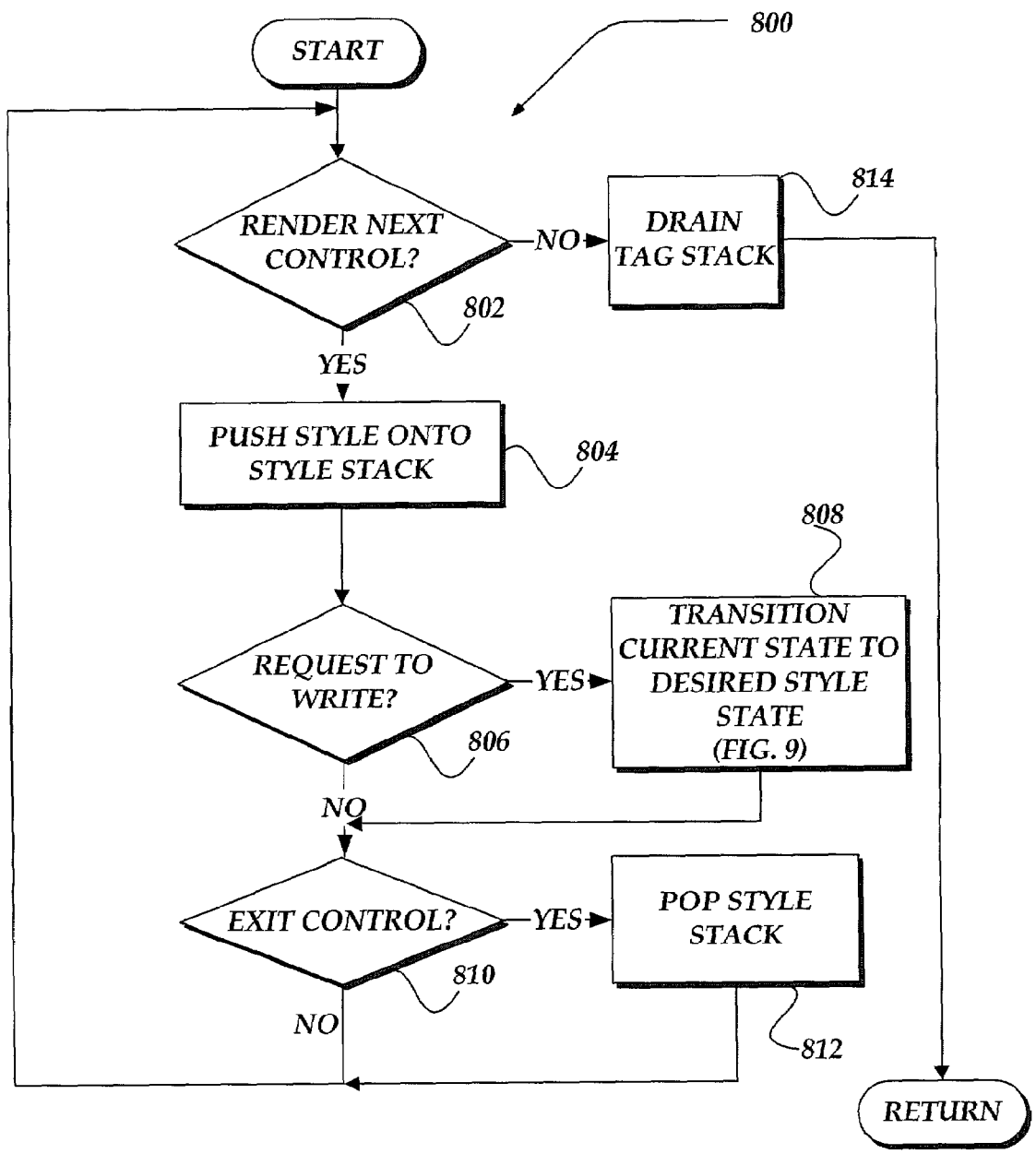
FIG. 8 is a logical flow diagram generally illustrating one embodiment for rendering optimized markup output to a requesting mobile device in a single pass.

Block 706 is illustrated in detail in FIG. 8 and described in the related discussion. Briefly, however, block 706 builds and traverses a control hierarchy to render optimized markup output in a single pass in response to the requesting mobile device. In one embodiment of the present invention, the capabilities of the requesting mobile device are employed to further optimize the markup output by omitting markup tags that are not compatible with the capabilities of the requesting device.

The process continues at block 708 where the optimized markup output is communicated to the requesting mobile device. Upon completion of block 708, the logical process flow ends.

Traversing Control Objects

FIG. 8 is a logical flow diagram generally illustrating one embodiment for rendering optimized markup output to a requesting mobile device in a single pass, described above at block 706 in FIG. 7, in accordance with the invention. Process 800 of FIG. 8 begins, after a start block, at decision block 802 where a control hierarchy has been constructed that describes a requested page.

At decision block 802, it is determined whether there are any control objects that are to be rendered. If there are no more controls to be rendered, the process proceeds to block 814. Otherwise, if there is a control to be rendered in the control hierarchy, the process proceeds to block 804. It should be apparent that during the first pass, process 800 should proceed to block 804.

At block 804, when a control within the control hierarchy remains to be rendered, that control's style properties are pushed onto Style Stack. In one embodiment, the control calls a method that passes the effective style for the current control to writer 314 (FIG. 4). Writer 314 employs state machine 316 to preserve the style properties by pushing the properties onto Style Stack 406. The process proceeds to decision block 806.

At decision block 806, it is determined whether the current control object has any information to be written (emitted) for the mobile device. If the control object contains a call to write information, the process proceeds to block 808. Briefly described here, and described in detail in conjunction with FIG. 9, block 808 transitions to the desired style state of the requesting control object, from the current style state properties, which were transmitted or previously written. After block 808, the process proceeds to decision block 810.

Alternatively, if it is determined at decision block 806, that the control object does not request information to be written, the process proceeds to decision block 810.

At decision block 810, it is determined whether to exit the current control object. If so, the process proceeds to block 812, where the contents of the top level of the Style Stack are removed or popped before returning to decision block 802.

Alternatively, if at decision block 810, it is determined that the current control object is not to be exited, such as when the current control contains children control objects, the process returns to decision block 802.

Process 800 continues through the control object hierarchy as described above, until at decision block 802, it is determined that no further controls exist to be rendered. When it is determined at decision block 802 that no more controls are to be rendered, including a container control, the process proceeds to block 814.

At block 814, the markup tags that remain open on the Tag Stack are closed, and written out for transmission to the mobile device. As each markup tag is closed, it is popped off the Tag Stack. After all markup tags have been drained (popped off the stack), process 800 returns to block 708 (shown in FIG. 7) to perform other actions.

Transitioning States

Figure 9:
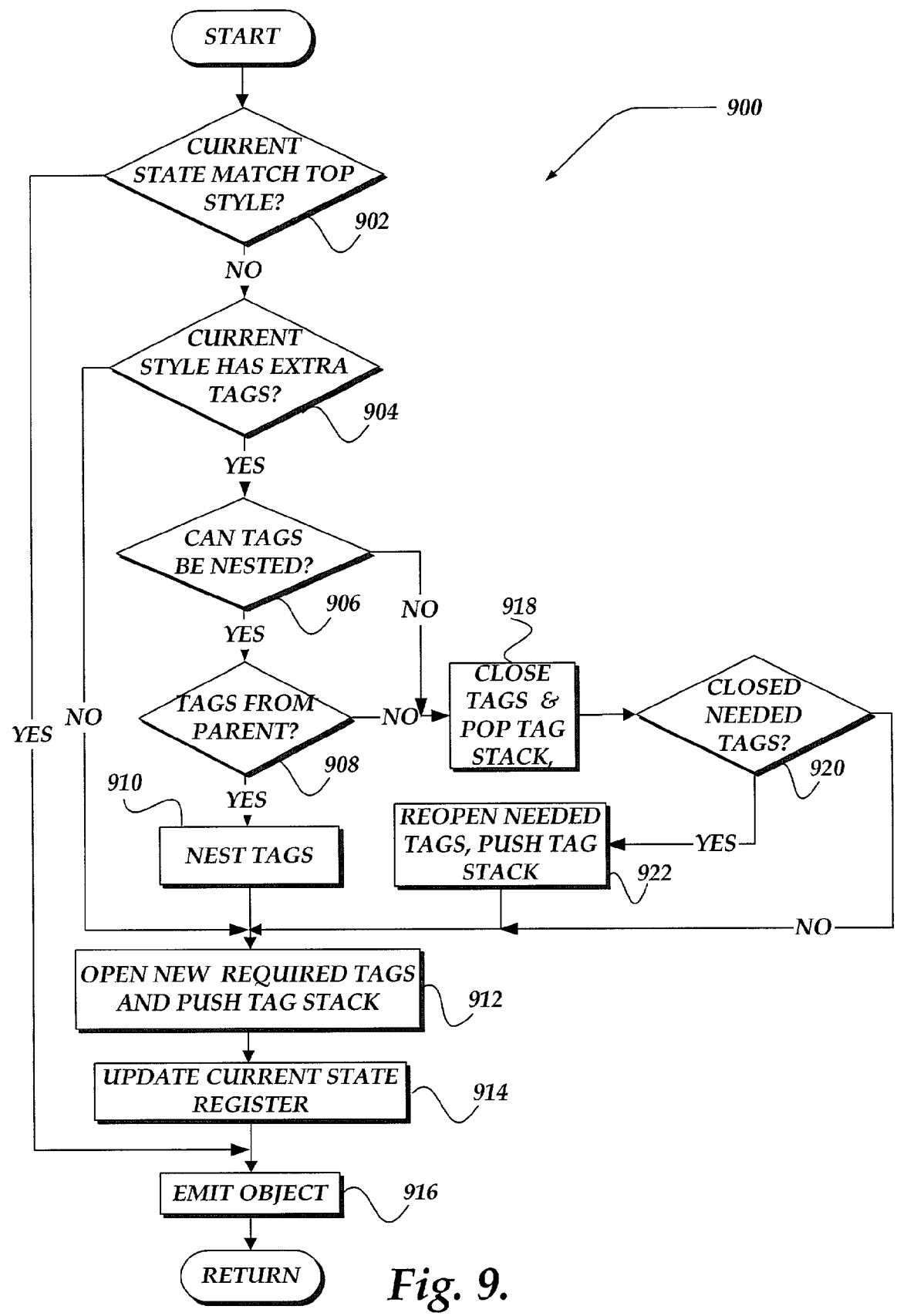
FIG. 9 is a logical flow diagram generally illustrating one embodiment for transitioning the current style state to the desired style state.

FIG. 9 is a logical flow diagram generally illustrating one embodiment for transitioning a current style state to a desired style state as briefly described above at block 808 in FIG. 8, in accordance with the invention. Process 900 of FIG. 9 begins, after a start block, at decision block 902.

At decision block 902, it is determined whether the markup tag properties of the Current State Register matches the style properties on the top of the Style Stack. If it is determined that the style properties do match, then no markup tags are emitted or written. The process proceeds to block 916, where any information the control may have to emit, is emitted. Alternatively, if at decision block 902 it is determined that the style properties within Current State Register do not match the style properties of the top of the Style Stack, the process proceeds to decision block 904.

At decision block 904, it is determined whether style properties on the top of the Style Stack contain additional markup tags not in the Current State Register. If it is determined, at decision block 904, that there are no additional markup tags, the process proceeds to block 912. Alternatively, if it is determined that there are extra markup tags on the top stack level that are not included in the Current State Register, the process proceeds to decision block 906, to determine the correct order to write out the markup tags. The traditional approaches for optimizing markup output would look ahead in the remaining control objects to determine the markup tag properties to be rendered. The present method instead looks at the Style Stack to predict the optimal order to open the markup tags.

At decision block 906, it is determined whether the markup tags have an optimal nesting order. If it is determined that the markup tags cannot be nested, the process proceeds to block 918. Alternatively, at decision block 906, if it is determined that the markup tags can be nested, the process proceeds to decision block 908.

By way of illustration, a traditional approach that looks ahead in the markup, would observe that rendered output for both controls are "bold," but only the first control is "italic." Therefore, the following markup:

```
<b> <i> <font color="Blue"> Hello</font> </i> <b>
<b> <font color="Red">World</font> </b>
``` could be optimized so that both controls share a bold tag:

```
<b> <i> <font color="Blue"> Hello</font> </i>
<font color="Red">World</font> </b>
```

However, for this optimization to be made, the <i> markup tag must be opened after the <b> tag, otherwise the result would interleave the tags, such as:

```
<i> <b> <font color="Blue"> Hello</font> </b> </i>
<b> <font color="Red">World</font> </b>
``` which is contrary to current HTML standard syntax. Therefore, if the <i> tag is opened first, then the <b> tag would have to be closed before closing the <i> tag, and then the <b> tag would have to be reopened. This would be equivalent to the unoptimized case. Therefore, in the example, opening the <b> tag before the <font> tag is not an arbitrary decision, but rather based on studies conducted by the inventors.

At decision block 908, it is determined whether a given markup tag came from a parent control. If it is determined that the markup tags are from the parent control, (a lower level on the Style Stack) the process proceeds to block 910 where the markup tags will be nested or ordered.

Alternatively, if at decision block 908, it is determined that the markup tags are not from the parent control, the process continues to block 918.

At block 918, markup tags that could not be nested or are not derived from the parent control are closed. That is, a close markup tag is written out for transmission to the requesting mobile device. Additionally, markup tags that are closed are popped from the Tag Stack. The process then continues to decision block 920.

At decision block 920, it is determined whether the closed markup tags are actually needed for the current style request. If it is determined that the closed markup tag is not required to satisfy the current style request, the process continues to block 912. Alternatively, if it is determined that a needed markup tag was closed, the process continues to block 922.

At block 922, markup tags that were closed to preserve the object hierarchy rules, are reopened. That is, the open markup tag is written out for transmission to the requesting mobile device. Additionally, the opened markup tag is pushed onto the Tag Stack. The process continues to block 912.

At block 912, any new required markup tags in the control's style request are opened (e.g., emitted as an open markup tag for transmission to the requesting mobile device). Additionally, the new required markup tags are pushed onto the Tag Stack. After block 912, the process continues to block 914.

To illustrate, a required markup tag may be determined based on the capabilities of the requesting mobile device. For example, some devices, although based on HTML, do not support the use of some markup tags, such as the <font> tag. Such markup tags would be determined not to be required. Therefore, eliminating the transmission of such markup tags provides an improvement in throughput to the requesting mobile device.

At block 914, the Current State Register is updated to reflect the markup tags that are currently active. As Current State Register 404, in FIG. 4, is a single buffer string, any previous markup tag information is replaced with the current style information. After block 914, the process proceeds to block 916.

At block 916, information is emitted to the requesting device employing the current markup style tags. After block 916, the process returns to the decision block 810 in FIG. 8 to perform other actions.

Illustrative Example

By way of illustrating the generalized operation of the above-described embodiment of the present invention, suppose that a mobile device has requested server application objects that would render the following output:

Hello World!!!

where "Hello" is in bold, italicized, and to be displayed on the requesting mobile device in the color blue, the word "World" is to be displayed on the mobile device as bold, and in the color red, while "!!!" is to be displayed as bold and in the color blue.

Figure 5:
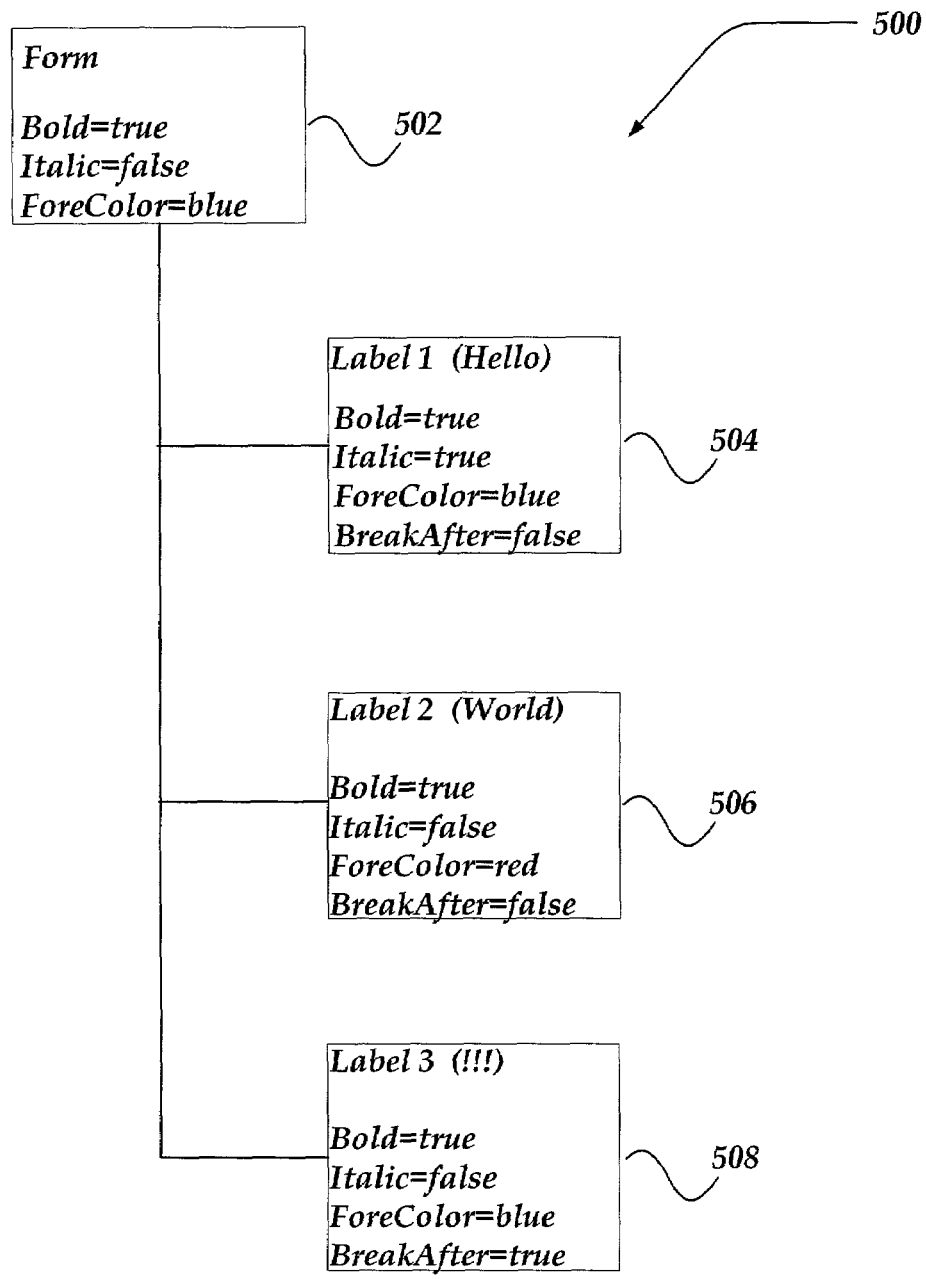
FIG. 5 provides one example of a possible control hierarchy that would be traversed to render the example output.

As described above in conjunction with FIG. 3, during runtime a control hierarchy would be constructed for the above example output based on those server application objects. FIG. 5 provides one example of a possible control hierarchy that could be constructed from the server application objects to render the above output. In FIG. 5, the example hierarchy 500 includes form control 502, Label1 control 504, Label2 control 506, and Label3 control 508.

Form control 502 is a container object that includes style instructions to set future output to "bold, and "blue." Label1 control 504 includes instructions to render the output "Hello" in "bold, blue, and italicized." No break is requested after the word "Hello." Label2 control 506 includes instructions to render the output "World" in "bold, non-italicized, and in the color red." Again, no break is requested after the output of "World." Label3 control 508 includes instructions to render the output "!!!" in "bold, non-italicized, and in the color blue." After the output "!!!," Label3 control 508 requests a break command to be emitted to the requesting device.

At runtime, when example hierarchy 500 is traversed, each control would invoke a sequence of calls to writer 314. FIG. 6 is a table illustrating an illustrative sequence of calls to methods that writer 314 would expose for rendering the markup tags in the example illustrated in FIG. 5. In one embodiment, writer 314 exposes an EnterStyle method, an ExitStyle method, and a Write method. The EnterStyle method may be called when it is desired to make the style properties of the calling method the current style. The Write method may be called when it is desired to output information, such as text, in the current style. Additionally, ExitStyle may be called to indicate that the information subject to the desired style has concluded, which traditionally resulted in closing any open style tags.

FIG. 6 further illustrates a traditional approach to markup output that would be generated by the example illustrated in FIG. 5 and the improved markup output generated by the present invention.

Referring to the example illustrated in FIG. 5, the first control to be rendered is form control 502. Form control 502, which is a container control with no visible representation, calls the render methods of each of the controls it contains. That is, form control 502 executes the render methods of Label1 control 504, Label2 control 506, and Label3 control 508 contained within form control 502, before form control 502 is exited.

Figure 10:
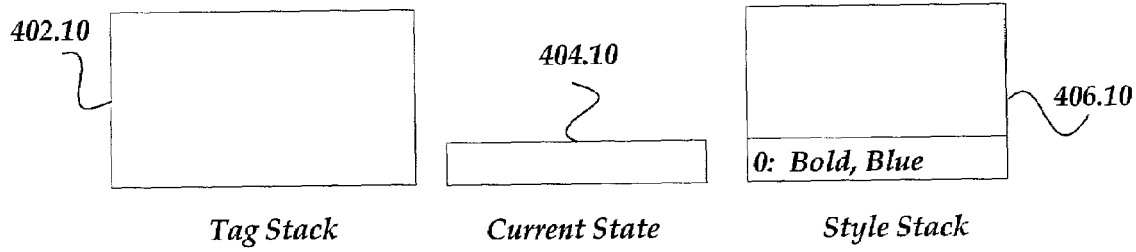
FIGS. 10–18 illustrate various configurations of the state machine as the example in FIG. 5 is processed, in accordance with the present invention.

When form control 502 is rendered, its style properties are pushed onto the Style Stack. This operation is illustrated in FIG. 10, where the style properties of "bold" and "blue" of form control 502 have been pushed onto Style Stack 406.10.

Because form control 502 does not write any information, a write method or request is not invoked. Because there is no information being written, there is no content that needs to be "bold" or "blue," so no markup tags would be written. Thus, the current state remains undefined until something is written. As illustrated in FIG. 6, at row 1, the traditional approach would have resulted in rendering potentially extraneous markup tags for an empty form, whereas the present invention would not have rendered the markup tags.

Because form control 502 contains children controls, the process loops to render the child control. Therefore, at this step, the process does not pop contents from the Style Stack, and instead, begins to render the first child control, Label1 control 504.

Figure 11:
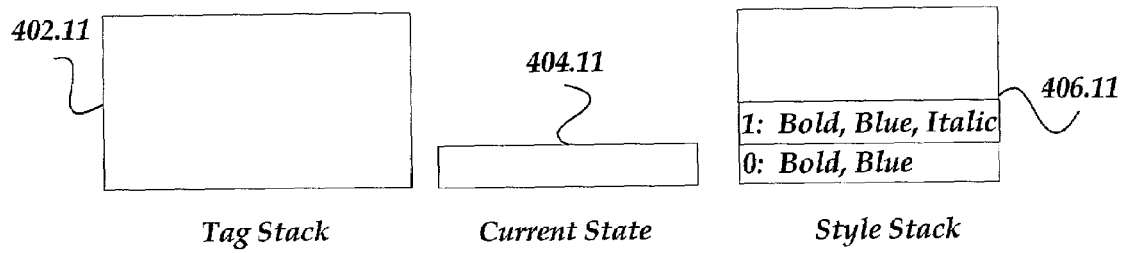

As illustrated in FIG. 11, the process begins to render the Label1 control 504 by pushing its style properties (bold, blue, italics) onto the Style Stack 406.11. It is seen that "bold" and "blue" were pushed onto the stack by form control 502 (FIG. 5). If the Current State Register 404.11 contains additional styles beyond Label1 control 504, it will be probable that the subsequent controls will also inherit the "bold, blue" style. Therefore, the present invention leverages the object hierarchy of parent/children controls on Style Stack, to predict the optimal order to open the tags (nest the tags).

As seen in FIG. 6, row 2, the present invention emitted the markup tags and text to the requesting mobile device a single data stream in response to the write (Label2.Text) call.

Figure 12:
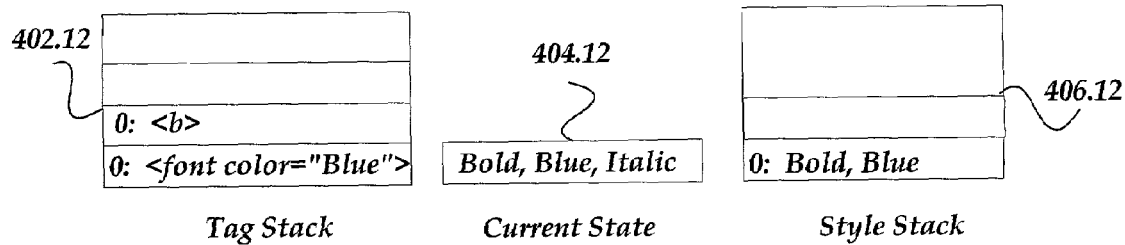

Continuing with the example in FIGS. 5 and 12, the process did not close the "italics" (<i>) markup tag after the write request from Label1 control 504. If the next control to be rendered happens to be "bold, italic, blue," it will share the current style tags already written, thus avoiding unnecessary style tags to close the current "italics" style and immediately reopen it.

The process proceeds to exit Label1 control 504 where Label1 control 504's style information is popped from the Style Stack. FIG. 12 illustrates the status of Tag Stack 402.12, Style State 406.12, and Current State Register 404.12 upon exiting Label1 control 504.

Next, form control 502 calls render on the next label, Label2 control 506. The style information of Label2 control 506 is pushed onto Style Stack, as illustrated by Style Stack 406.13 in FIG. 13.

Figure 13:
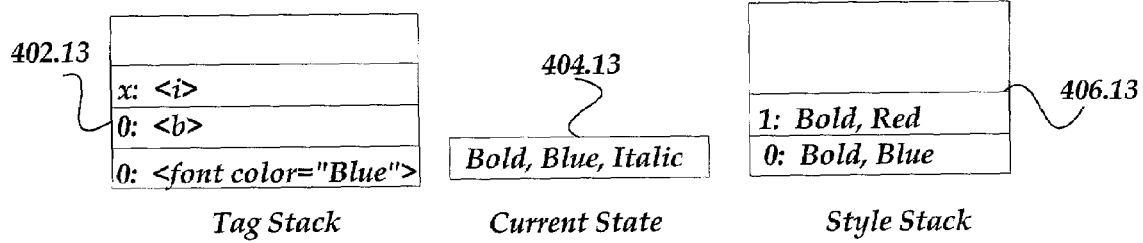
Figure 14:
Figure 15:
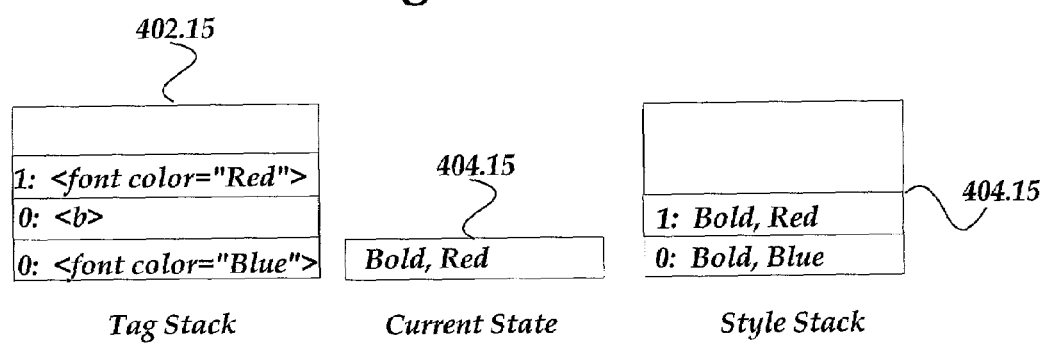

When the request to write is made (row 5, FIG. 6) for rendering the output for Label2 control 506, a comparison is again made between the top style in the Style Stack and the current Style register. It is now seen that the "italics" markup tag should be closed, and popped from the Tag Stack, as seen in FIGS. 13–14.

Figure 16:
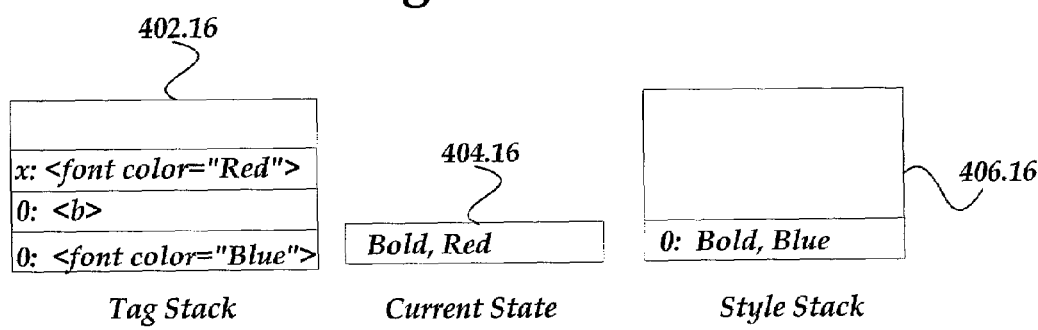
Figure 17:
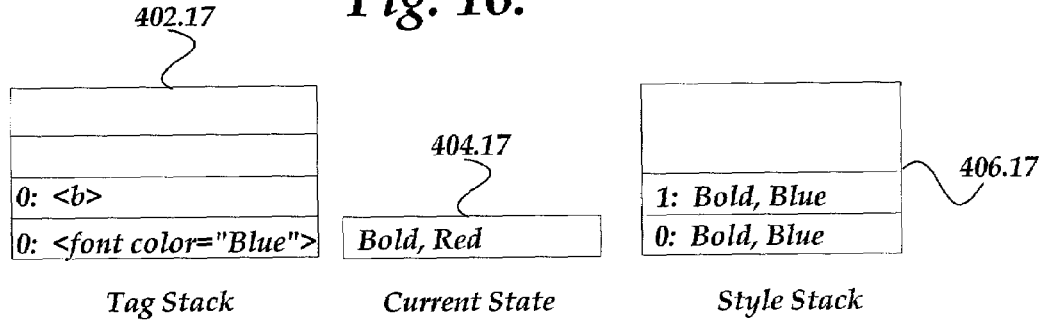

However, transitioning from "blue" to "red" may be done in several ways. The <b> and <font> markup tags could be closed and reopened, or a new font markup tag could be nested in the original. Again, the present invention leverages the object hierarchy. As a result, Label2 control 506 would have its font markup tag nested, as illustrated in Tag Stack 402.15 in FIG. 15. After writing the contents of Label2 control 506 (that is, writing "World") to the requesting mobile device, Label2 control 506's style information is popped from the Style Stack. FIG. 16 illustrates the results of the state machine's stacks and register after exiting Label2 control 506.

The last control, Label3 control 508, in FIG. 5 is then rendered. Again, its style is pushed onto the Style Stack. When the process is executed (Label3 has information to be written), transitioning from the current state to the desired style state simply involves closing the <font> markup tag on the top of the Tag Stack (see FIG. 16, Tag Stack 402.16, and FIG. 17, Tag Stack 402.17).

Figure 18:
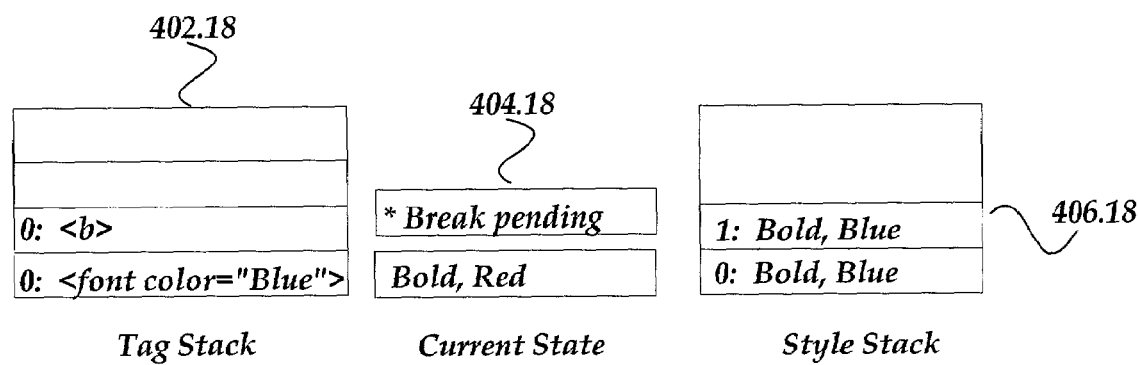

Label3 control 508 in the example indicates that a break should be written before the next control, however, the <br> markup tag is not written by the present invention until the next request to write (as illustrated in FIG. 18).

After the last label and form are exited, and the Tag Stack is drained, the pending break request will have no effect in this example, because there are no following controls.

FIG. 6 provides a comparison of the output transmitted by a traditional approach and the present invention, whereby the present invention, in this example, has transmitted about 40% less data to the mobile device than the traditional approach.

Alternate Embodiments

It will be apparent to those skilled in the art that the above example does not illustrate all the possible objects or controls that may be displayed on mobile devices $116_{A-C}$.

For example, there are instances where it is desirable to only write out the formatting information (e.g., bold, color, and the like) or alternatively only write out layout information (e.g., right aligned, and the like). Therefore, another embodiment of the present invention determines if a request to write affects only layout or only formatting markup tags emissions. In this manner, additional markup tags may be filtered out which provide virtually no effect on the current control.

Additionally, certain conditions arise in HTML or other markup languages that ignore the consideration of already opened markup tags. At these instances, it is necessary to start a new context in state machine 316 in FIG. 4 and return to that state at a later point in the object hierarchy. For example, once the rendering of an HTML table begins, formatting of the text outside of the table does not apply to the information inside the table. Therefore, yet another embodiment of the present invention determines if such a condition has arisen. If the condition has arisen, the invention pushes an entire instance of the current state machine, and creates a new version of the state machine. Upon exiting the condition, such as a table rendering, the invention pops the earlier instance of the state machine.

Moreover, it will be apparent to one of ordinary skill in the art that the present invention is not limited to the optimization of markup tags. Any hierarchical structure that may include redundant information may benefit from the single pass optimization of the present invention. For example, a database structure may be employed, without departing from the spirit or scope of the present invention.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A computer system for providing optimized markup language output sent to a requesting device in a single pass, the system comprising:
 a device adapter to provide a hierarchy of two or more server objects containing information related to the display of the content on the requesting device, wherein each server object has one or more style states;
 a device capabilities component coupled to a writer and configured to provide to the writer capabilities of the requesting device by extracting an identification from the request of the requesting device;
 a state-machine couple to the two or more server objects and configured to preserve a current style state and a desired style state, the state machine comprising:
  a tag stack having a first pushdown list in which information is stored about what markup language tags have been written to the requesting device;
  a style stack having a second pushdown list in which information is stored about markup language tags representing the desired style state;
  a current state register that stores markup language tags that represent the current style state; and
 the writer coupled to the state-machine and the device adapter, the writer configured to receive an object to be rendered, the writer configured to determine whether the object has any information to be written to the requesting device, if the object has information to be written, the writer configured to store the desired style state in the style stack, the writer configured to determine whether the current style state, in the current state register, matches the desired style state, in the style stack, if the current style state matches the desired style state, the writer configured to not write a markup language tag for the desired style state to the requesting device, if the current style state does not match the desired style state, the writer configured to output one or more markup language tags to the requesting device, to transition from the current state to the desired style state, wherein at least one unnecessary markup language tag is not written to the requesting device, the writer further determines whether the desired style state includes markup language tags that ignore current state markup language tags, if the desired style state includes markup language tags that ignore current style state tags, then performing steps: pushing the state-machine onto a state-machine stack, instantiating a second state-machine configured to preserve the desired style state, and if the desire style state includes markup language tags that ignore markup language tags have been closed, popping the state-machine from the state-machine stack.

2. The computer system as defined in claim 1, wherein the writer further dynamically determines a sufficient number of markup language tags to be written such that markup language tags not supported by the capabilities of the requesting device are identified as unnecessary.

3. The computer system as defined in claim 1, wherein the tag stack and the style stack are configured as last-in-first-out data structures.

4. The computer system as defined in claim 1, further comprising: a mobile runtime process component, the mobile runtime process component instantiating the device adapter, the mobile runtime process component generating the hierarchy of two or more server objects.

5. The computer system of claim 1, wherein, the device adapter instantiates the writer.

6. The computer system as defined in claim 1, further comprising one or more adapter sets, the one or more adapter sets including one or more device adapters, wherein each adapter set providing one or more device adapters that provide server object in a predetermined markup language.

7. The computer system as defined in claim 6, wherein the predetermined markup language include one of hypertext markup language (HTML), wireless markup language (WML), compact hypertext markup language (CHTML).

8. The computer system as defined in claim 1, wherein the device adapter transforms the one or more server objects in requesting device-specific ways.

9. A computer-implemented method for providing optimized markup language output sent to a requesting device in a single pass, comprising:
receiving a request for the markup language output from the requesting device;
extracting an identification from the request of the requesting device;
generating a hierarchy of two or more server objects containing information related to the display of the markup language on the requesting device, wherein each server object has one or more style states;
storing a current style state in a current state register;
receiving a desired style state that represents a desired style state of markup language tags;
storing the desired style state in a style stack;
comparing the-desired style state in the style stack to the current style state that in the current state register;
determining if current style state is different than the desired style state;
if the current style state is different from the desired style state, outputting one or more markup language tags to the requesting device, to transition from the current style state to the desired style state, wherein at least one unnecessary markup language tag is not written to the requesting device;
storing the one or more markup language tags to a tag stack;
if the current style state is the same as the desired style state, failing to write a markup language tag to the requesting device, to transition from the current style state to the desired style state;
determining whether the desired style state includes markup language tags that ignore current style state markup language tags;
if the desired style state includes markup language tags that ignore current style state markup tags, then performing steps: pushing a state-machine onto a state-machine stack; instantiating a second state-machine configured to preserve the desired style state; and if the desired style state includes markup language tags that ignore markup language tags have been closed, popping the state-machine from the state-machine stack.

10. The computer-implemented method as defined in claim 9, wherein the current style state matches a previously received desired style state.

11. The computer-implemented method as defined in claim 9, wherein outputting a sufficient a number of markup language tags further comprises delaying actually writing out a closing markup language tag until the desired style state conflicts with the current style state.

12. The computer-implemented method as defined in claim 9, wherein outputting a sufficient number of markup language tags further comprises nesting markup language tags in a predetermined order that causes unnecessary close markup language tags to be omitted.

13. The computer-implemented method as defined in claim 9, further comprising:
determining a capability of the requesting device from the requesting device; and
outputting one or more markup language tags that are supported by the capability of the requesting device to transition from the current style state to the desired style state.

14. A computer-implemented method as defined in claim 9, further comprising determining if another server object needs to be written; and if there is no other server object to be written, draining the tag stack.

15. A computer-implemented method as defined in claim 9, further comprising; in response to writing one or more markup language tags to transition from the current style state to the desired style state, changing the current style state in the current state register to the desired style state; and pushing the one or more markup languages tags to the tag stack.

16. A computer system for providing optimized markup language output sent to a requesting device in a single pass, comprising:
means for receiving a request for the markup language output from the requesting device;
means for generating a hierarchy of two or more server objects containing information related to the display of the markup language on the requesting device, wherein each server object has one or more style states;

means for determining a capability of the requesting device from the request;

means for receiving a desired style state that represents a desired style state of markup language tags in a current state register;

means for storing a current style state that represents a current style state of markup language tags;

means for storing the desired style state in a style stack;

means for comparing the stored desired style state to the stored current style state;

means for providing to a writer capabilities of the requesting device by extracting an identification from the request of the requesting device;

means for determining whether the desired style state includes markup language tags that ignore current style state markup language tags;

if the desired style state includes markup language tags that ignore current style state markup language tags, then performing steps:

means for pushing a state-machine onto a state-machine stack;

means for instantiating a second state-machine configured to preserve the desired style state; and if the desired style state includes markup language tags that ignore markup language tags have been closed, means for popping the state-machine from the state-machine stack;

means for determining if the current state matches the desired style state;

if the current style state matches the desired style state, means for failing to write a markup language tag to the requesting device, to transition from the current style state to the desired style state;

if the current style state does not match the desired style state, means for outputting one or more markup language tags that are supported by the capability of the requesting device to transition from the current style state to the desired style state, wherein at least one unnecessary markup language tag is not the requesting device; and means for storing the one or more output markup language tags to a tag stack.

* * * * *